(12) United States Patent
Munoz Saiz

(10) Patent No.: US 12,025,083 B2
(45) Date of Patent: Jul. 2, 2024

(54) OXIDIZER AND FUEL SUPPLY SYSTEM FOR INTERNAL COMBUSTION ENGINES

(71) Applicant: Manuel Munoz Saiz, Almeria (ES)

(72) Inventor: Manuel Munoz Saiz, Almeria (ES)

( * ) Notice: Subject to any disclaimer, the term of this patent is extended or adjusted under 35 U.S.C. 154(b) by 0 days.

(21) Appl. No.: 18/446,145

(22) Filed: Aug. 8, 2023

(65) Prior Publication Data
US 2023/0383713 A1 Nov. 30, 2023

Related U.S. Application Data

(63) Continuation of application No. PCT/ES2022/000004, filed on Feb. 8, 2022.

(30) Foreign Application Priority Data

Feb. 8, 2021 (ES) .............................. ES202100050U
Feb. 16, 2021 (ES) .............................. ES202100060U
Feb. 8, 2022 (ES) .............................. ES202200046U

(51) Int. Cl.
*F02M 37/00* (2006.01)
*F02M 23/00* (2006.01)
*F02M 35/024* (2006.01)

(52) U.S. Cl.
CPC ...... *F02M 37/0023* (2013.01); *F02M 23/006* (2013.01); *F02M 35/024* (2013.01)

(58) Field of Classification Search
CPC . F02M 37/0023; F02M 23/006; F02M 35/024
See application file for complete search history.

(56) References Cited

U.S. PATENT DOCUMENTS

| | | | |
|---|---|---|---|
| 8,151,553 B1 | 4/2012 | Schechter | |
| 2005/0042488 A1* | 2/2005 | Niedzwiecki | H01M 8/04947 |
| | | | 429/432 |
| 2007/0101975 A1* | 5/2007 | Moon | F02M 25/12 |
| | | | 123/585 |
| 2012/0005959 A1* | 1/2012 | Chen | C01B 3/36 |
| | | | 48/61 |
| 2014/0252156 A1 | 9/2014 | Hiebl et al. | |
| 2016/0265492 A1 | 9/2016 | Powell et al. | |

FOREIGN PATENT DOCUMENTS

| CN | 202012417 U | 10/2011 |
|---|---|---|
| EP | 0340545 A2 | 11/1989 |
| GB | 2172559 A | 9/1986 |

* cited by examiner

*Primary Examiner* — Jacob M Amick
*Assistant Examiner* — Charles J Brauch
(74) *Attorney, Agent, or Firm* — Robert M. Schwartz; Alfred K. Dassler

(57) ABSTRACT

Oxidizer and fuel supply system for internal combustion engines, which includes oxygen supplies for the engines, particle filters, oxygen generators using nanofilters, pressurized oxygen bottles and air compressors, O2 loading media, by means of bottles, carboys or interchangeable tanks or hoses, Complementary means of nanomolecular membrane filters that separate O2 from air, performing the separation by means of aspiration or suction from the combustion engine or the suction or impulsion of a pump or compressor driven by an electric motor or mechanically by the combustion engine itself; Storage means for the separated or obtained O2; means for controlling the variable fuel/O2 mixture by means of a processor or an ECU (engine control unit); and as fuel: synthetic fuel, hydrocarbons, alcohols or hydrogen.

19 Claims, 16 Drawing Sheets

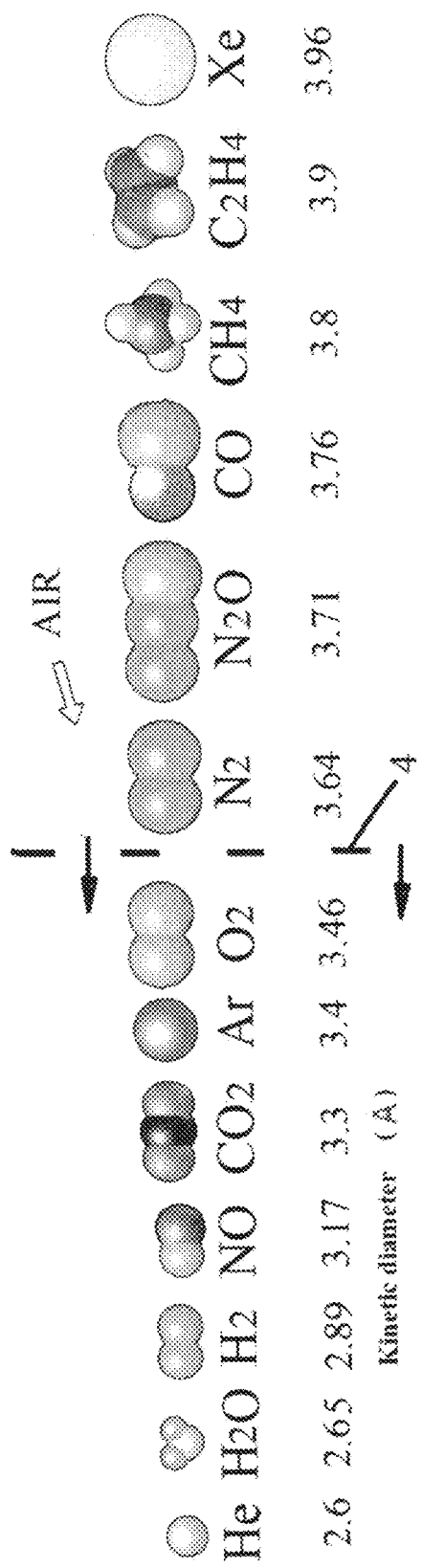
FIG. 1
FIG. 2
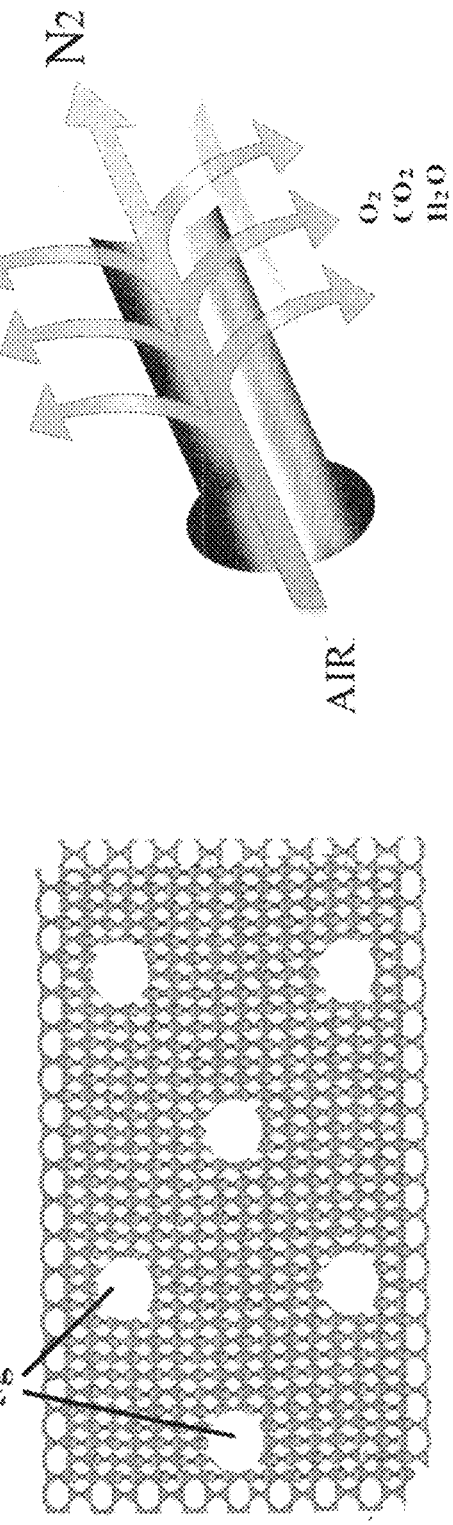
FIG. 3

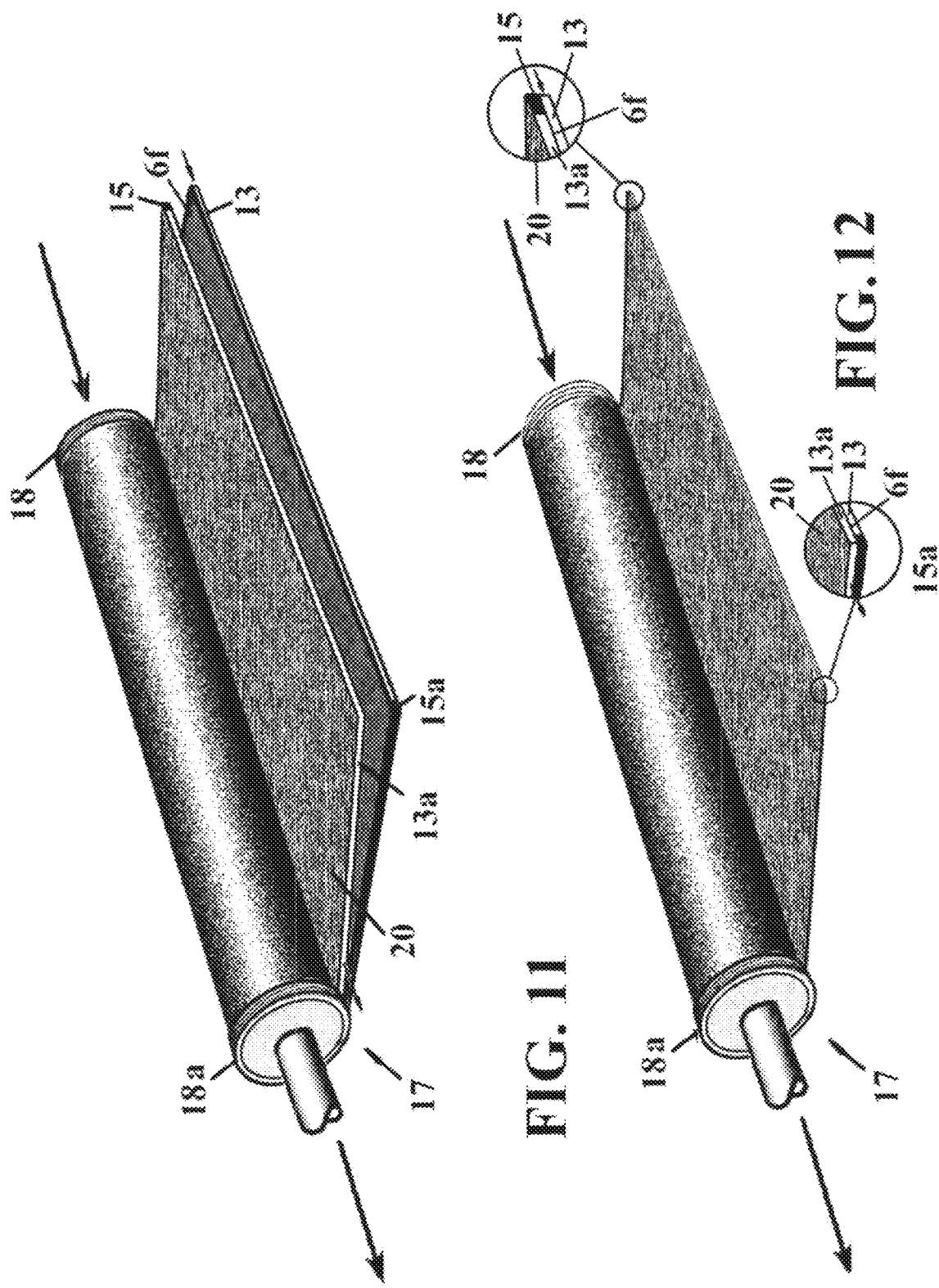

OXIDIZER AND FUEL SUPPLY SYSTEM FOR INTERNAL COMBUSTION ENGINES

CROSS-REFERENCE TO RELATED APPLICATION

This application is a continuation, under 35 U.S.C. § 120, of copending International Patent Application PCT/ES2022/000004, filed Feb. 8, 2022, which designated the United States; this application also claims the priority, under 35 U.S.C. § 119, of Spanish Patent Applications
(a) U202100050, filed Feb. 8, 2021,
(b) U202100060, filed Feb. 16, 2021,
(c) U202200046, filed Feb. 8, 2022;
the prior applications are herewith incorporated by reference in their entirety.

FIELD AND BACKGROUND OF THE INVENTION

In oxidizer and fuel feeding systems in internal combustion engines in general.

STATE OF THE ART

Current engines use fossil fuels and atmospheric air as oxidizer, which carries approximately eighty percent of gases, which hinder combustion and produce polluting, toxic and carcinogenic products.

SUMMARY OF THE INVENTION

To use a simple system (especially if only bottles or O2 refills are used), economical and very useful, applying O2, gas or liquid as oxidizer and as fuels in addition to hydrocarbons, alcohols and green hydrogen, by means of bottles or tanks, or by injecting or recharging them with hoses. Avoiding toxic and polluting gases. The CO2 produced is stored and extracted in bottles or tanks, or is sucked up and extracted with hoses. O2 is used alone or mixed with a noble gas, but due to its abundance and ease of obtaining, only argon is used.

Provisionally, in current engines the O2 can be applied in a variable way, reducing the air and consequently the N2 that intervenes in the combustion.

Improve combustion in high places (elevations) or places with a lot of environmental pollution. Reducing or eliminating polluting gases, favoring the health of the population and avoiding global warming. In Mexico, about 17,000 people die a year from this cause, not counting other diseases due to pollution.

Use a filtering system, which, in some cases, due to the few layers used by the membranes and their large surface, it is not necessary to apply pressure, and the suction made by the motor may be sufficient. Using large-surface membranes in the form of flat, tubular sheets or of the type called hollow fiber, also tubular in structure, multi-layered with pores or cylindrical perforations, multiple nanotubes laterally attached to each other, graphene filters or other simple-to-use nanomolecular elements. or multiple layers with or without calibrated perforations. Which provide easy penetration and separation of the molecules, some of them without having to use great pressure. Hollow polymer fibers are packaged together in a functional unit, called a membrane module, which consists of a bundle of several thousand hollow fibers inside a shell made of carbon/stainless steel, aluminum, or FRP (Fiber Reinforcement Composites with polymers). Each end of the fiber bundle is embedded in a resin body that covers the internal cross-sectional area of the housing, so that supply air is forced into the openings or side of the fibers at the module inlet and the Oxygen-enriched permeate produced will be released at a pressure close to ambient pressure through a radial outlet located in the casing, between the two bodies of resin is collected at the outlet of the module. Nitrogen is released or can be collected and stored. Typically, membrane modules are installed in a parallel configuration so that the output of each module contributes proportionally to the system capacity. The kinetic diameter of oxygen is 3.46 Å and that of nitrogen is 3.64 Å. Therefore a filter with 3.5 Å pores are suitable for filtering.

Use of renewable energy to obtain, compress and store O2 in a deposit, tank or bottles for its use with or without mixing it with argon.

With the foregoing and other objects in view there is provided, in accordance with the invention, an oxidizer and fuel supply system for an internal combustion engine that includes an electronic controller. An oxygen supply is fluidically connected to the engine, the oxygen supply includes a first regulating valve connected to the controller and controlled by the controller to control a flow of oxygen. A fuel supply is fluidically connected to the engine. The fuel supply includes a second regulating valve connected to the controller and controlled by the controller to control a flow of the fuel.

According to another aspect, the oxygen supply includes a compressor fluidically connected to a nanomolecular filter to feed air to the nanomolecular filter. The nanomolecular filter is constructed to filter the air fed through the nanomolecular filter to filter out nitrogen and allow oxygen to pass the nanomolecular filter for supply to the engine.

According to another aspect, the oxygen supply includes an oxygen storage bottle filled with oxygen for supply to the engine.

According to another aspect, the system further includes a storage tank fluidically connected to the nanomolecular filter to store oxygen that is in excess to the requirements of the engine.

According to another aspect, the nanomolecular filter is a nanomolecular membrane filter.

According to another aspect, the nanomolecular filter is a hollow fiber membrane with walls that have 3.5 Å pores.

According to another aspect, the membranes have a layer of graphene or graphene oxide and have a thickness between 0.5 and 10,000 nm, and are formed by one or multiple layers of atoms, in which the pores are formed According to another aspect, the one or multiple layers of atoms are attached to a layer of permeable substrate.

According to another aspect, the nanomolecular filter is a cylindrical cartridges that has a cylindrical cover inside which there is a wound membrane defined by two fabric or fiber sheets, with pores or slits. The sheets carry a sheet of nanomolecular filter layer and an impermeable film on an outermost face. The cylindrical cartridge has a disc.

According to another aspect, the nanomolecular filter is defined by parallelepiped elements formed by multiple membranes arranged in flat or wound layers, alternated with other separators.

According to another aspect, the system includes a particle filter disposed upstream of the nanomolecular filter that is part of a hollow fiber module. The compressor drives the air through the particle filter to the hollow fiber module.

According to another aspect, the fuel supply has a tank and a fuel pump controlled by the controller to regulate the flow of fuel to the engine.

According to another aspect, the tank is a hydrogen storage bottle that has an external cover and an inner cover that define a chamber therebetween. The chamber has a fluid at a higher pressure than the internal pressure of the hydrogen. The external cover is fireproof against flames.

According to another aspect, the controller is configured to receive operating signals from the engine and, depending on the regime and type of exhaust gases, controls the flow of fuel and oxygen.

According to another aspect, the storage bottle carries a liquefied gas and has an intermediate chamber in which a vacuum is provided.

According to another aspect, the tank, the fuel pump, the controller and the engine are part of a vehicle.

According to another aspect, the system includes a trailer with a connection to a vehicle. The trailer carries the fuel supply and the oxygen supply.

According to another aspect, the system includes an air intake with a third regulating valve, the regulating valves control the air/O2 mixture in fixed or variable proportions with the processor.

According to another aspect, the fuel supply is a pressurized hydrogen bottle.

According to another aspect, the pressure of the oxygen or the hydrogen avoids or reduces the need for engine compression.

Advantages:

It allows to improve the oxygen supply, considerably increasing the power and producing great savings. It is economical, very useful, easy to apply, allows to take advantage of renewable energy and is very ecologically friendly.

It allows the use of smaller or less displacement engines and to reduce fuel in current engines. Therefore much less CO2 is produced.

Eliminates or reduces some of the exhaust gases from engines, of which the most harmful or toxic are CO (carbon monoxide), CO2 (carbon dioxide), nitrogen oxides (NO2), aldehydes, sulfur dioxide, soot and unburned hydrocarbons, the latter in addition to being toxic are carcinogenic and are produced mainly by poor combustion or lack of oxygen and excess nitrogen.

It uses, among others, graphene filters or other similar nanomolecular elements, preferably single or double layer with or without perforations, pores, slits or calibrated slits that provide easy penetration and separation of some gases without having to use high pressure.

With the achievement of graphene, a stable porous nanomembrane thinner than a nanometer, that is, 100,000 times thinner than a human hair, simple filtrations are achieved, without the need to use high pressure.

Made of two layers of graphene, the two-dimensional film of carbon atoms, is etched with tiny perforations, pores, slits, etc. of a precisely defined size that are permeable to small molecules. It allows to separate gaseous mixtures into their constituent parts. With a thickness of only two carbon atoms, light and flexible, it is the thinnest porous membrane that is possible to make technologically. With this type of atomic thickness membranes a maximum permeation can be reached. Allowing for the fastest possible rate of permeation.

The thinner the membrane, the lower its resistance to permeation.

The double layer graphene film or membrane has a high degree of purity.

The small amounts of some gases in the air are not important, therefore a single nanomolecular filtration is sufficient (pure oxygen is not needed, which is more difficult and expensive to obtain). The structure allows the passage of oxygen and other gases in small quantities, smaller diameter molecules including water vapor and prevents the passage of nitrogen and gases or elements whose kinetic diameter is greater.

With current technology, UV light with a wavelength of 185 nm and 254 nm is used, which achieves pores with a diameter of less than a nanometer and the pore diameter can be graduated, depending on the gas that is desired to be separated. The pore diameter will be somewhat smaller than the molecule of the mixed gas we wish to reject. Ultraviolet light produces an oxidative perforation, to create the molecular sieve. It is essential to create the molecular sieve in two dimensions. Hollow fiber membranes and clusters of nanotubes can also be used, the pore size should be 3.5 Å.

Allows variable use of O2 and fuel in current engines, until proper engine dimensions and proportions are achieved.

An oxygen-hydrocarbon, oxygen-alcohol or oxygen-hydrogen combustion is achieved, the latter without polluting waste or CO2, very useful in large cities. (oxygen and hydrogen can be mixed with argon). CO2 is compressed and stored in tanks or bottles that are exchanged or drawn from.

provides great environmental benefit and prevents climate change. using only this system it is possible to avoid climate change, something that is not achieved using all the other existing systems.

Allows the recovery of the explosion engine and hydrocarbons once transformed, because they have fewer inconveniences than electric batteries and be the most economic vehicles.

The high pressure of oxygen facilitates the work of the engine by not having to compress.

The use of this system should be mandatory.

Problem to Solve.

In internal combustion engines, imperfect and polluting combustion occurs due to the poor proportion in which oxidizers are involved, as a consequence of the undesirable elements that accompany oxygen when air is used. Very damaging especially in cities.

The oxidizer and fuel supply system for internal combustion engines replaces air with O2, and simultaneously reduces fuel, which especially in vehicles includes:

A means of loading O2, or O2 mixed with Ar, using bottles, carboys or interchangeable tanks;

Some means of recharging the O2, or O2 mixed with Ar, by means of hoses; —Filter media by means of particle pre-filters; and Complementary means of nanomolecular membrane filters that separate O2 from the air, performing the separation by means of the aspiration or suction of the combustion engine or the suction or impulsion of a pump or compressor driven by an electric motor or mechanically by the combustion engine itself.

Storage means for the O2 separated or obtained;

Means for controlling the variable fuel/O2 mixture by means of a processor or the ECU (engine control unit);

Means for controlling the variable air/O2 mixture by means of a processor or the ECU (engine control unit);

Means for compression and storage of CO2 from exhaust gases;

Means for discharging the CO2;

Means for refeeding the CO2 mixed with the engine fuel, once it has been treated and converted into fuel;

Some means of variable control of the fuel: synthetic fuel, hydrocarbon, alcohol or hydrogen and Some vehicles located in strategic places on land routes, loaded with oxygen, hydrogen and optionally biological or synthetic fuels, in bottles or canisters and some suppliers or dispensers of said elements in the form of pressurized or liquefied gas by means of hoses, adding installations in the vehicles for the application of fluids in the engines. The simultaneous use of O2 bottles and that obtained by filtering the air is very useful.

In all cases, O2 can be mixed and attenuated with a noble gas, generally argon, which is the cheapest and easiest to obtain.

Regulating valves control the fuel/O2 ratio and/or the air/O2 mixture. fixed or variable, manually or through the ECU. The O2/N2 ratio can be controlled, or the amount of N2 can be totally eliminated. This last case requires the use of new engines, or special engines, since the combustion is excessively powerful. In current engines you can also regulate or reduce the flow of fuel to avoid damaging the engine. New engines must be tuned or adapted for a fixed oxygen fuel ratio, depending on the size of the engine or the power it can handle.

The layers or sheets of graphene or graphene oxide can be supported by other highly porous sheets, plates or strata.

The filter holes are 0.35 nm in diameter.

In cases where a rapid flow is desired with multi-layer filters, it is necessary to use booster or suction motorized pumps to apply a small differential pressure. Large chambers with large filters can also be used where the obtained oxygen is obtained or stored. The performance of this system is so high that it is useful even applying power from the network in the separation between O2 and N2.

To prevent clogging or particulates from attaching to the membranes, the airflow is periodically reversed, or a particulate pre-filter is added.

In the filtering of O2 from the air, He, H2, CO2, Ar and water vapor accompany it, all of them with a smaller kinetic diameter and in small quantities except Ar, which occupies 0.9% of the air, but since it is a noble gas it does not affect. Very cheap industrial O2 is obtained.

The kinetic diameter of the O2 molecule is smaller than that of N2. Despite the fact that oxygen has a higher number (8) and atomic weight (15.9994u) than nitrogen (7) and (14.007u) respectively.

The device can also be supplied with a kit, consisting of the membranes, valves and installation. That applies to engines already manufactured.

The simplest way would consist of applying a nanomolecular filter in parallel or in series with the air intake. It would partially increase the oxygen, but it might be enough until you get better results with the filters.

Hollow fiber membranes and clusters of nanotubes can also be used, in the last two cases the conduit orifice should be 3.5 Å. It is interesting that the applied pressure is low or that the motor suction is sufficient.

The membranes have a thickness between approximately 0.5 and 10,000 nm, and are formed by one or multiple layers of atoms, to which multiple pores or perforations are made. They can be obtained by electrolytic deposition, by means of an electric current the metal is deposited. By chemical deposition, a chemical reaction causes the metal to be reduced and deposited, by deposition by vacuum plating. Pinholes can be performed using continuous or ultra-short flash lasers.

oxygen can be applied in four ways:
a) using exclusively cylinders with high pressure industrial oxygen or liquid oxygen (the gas could be mixed with argon).
b) using the O2 obtained through nanoparticle filters plus the pressure of a compressor or motor suction,
c) using the O2 bottles supplemented with the filtering with nanoparticles.
d) in current engines, O2 can be mixed with a proportion of the air used that acts as an attenuator or diluter.
the bottles can be recharged with oxygen, hydrogen and argon obtained from renewable energy, which are currently difficult to store. it would be a very useful and cheap way to store renewable energy.

Using alcohol as fuel only CO2 and water vapor are produced. with H2 only water vapor is produced as waste elements.

In some cases, when renewable energies are not used, it can be somewhat more expensive, however, even in that case, which is the worst, it is very beneficial both by increasing engine power and by benefiting health, the environment and climate change. therefore, its use could become mandatory.

In land vehicles, cars, trains, etc. allows the loading or replacement of bottles or refilling of O2 at stops. on boats, filtration is preferable.

Gasoline is combined with oxygen in a ratio of approximately 1/3 by weight, kerosene 1/2.5, and ethanol 1/2.
example: for a car that consumes 6 liters/h per 100 km. (5 kg of gasoline) would have to carry 15 kg of liquid o2 at 200-300 bars, plus the containers. whose weight gain is not problematic. neither is the cost, since industrial oxygen is very cheap. for 500 km. that same car should have 75 O2. but it is not necessary to carry this bottled amount, since more O2 can be generated during the route.

In airplanes, when using compressed oxygen, it is not necessary to compress the air, it can reach high altitudes and speeds, for which reason the resistance to advance is very small and the consumption of fuel and oxygen is very low. It would rise vertically with electric motors and fans and in the stratosphere it would fly with strato-jets.

O2 can be produced simultaneously, allowing fewer bottles to be carried.

Electric motors are powered by batteries and fuel cells.

Other features which are considered as characteristic for the invention are set forth in the appended claims.

Although the invention is illustrated and described herein as embodied in a oxidizer and fuel supply system for internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 shows a schematic view of an ordered group of air component elements involved in filtering;

FIG. 2 shows a schematic view of a membrane formed by two layers of atoms in which perforations have been made for filtering;

FIG. 3 shows a schematic, perspective and sectional view of a portion of hollow fiber for filtering the air;

FIGS. 11 and 12 show schematic and perspective views of wound membrane filters;

DETAILED DESCRIPTION OF THE INVENTION

FIG. 1 shows a series of elements, air components, separated by a nanomolecular filter 4 with multiple nanopores of 3.5 Å or less, approximately, ordered according to their kinetic diameter: On the right, in addition to the applied atmospheric air, the non-filtered elements $N_2$, $N_2O$, CO, $CH_2$, $C_2H_4$ and Xe are shown, whose kinetic diameters are respectively (3.64 Å, 3.71 Å, 3.76 Å, 3.8 Å, 3.9 Å and 3.96 Å), all of them greater than the diameter of the filter nanopores. To the left of the nanofilter are separated and stored the filtered elements $O_2$, Ar, C, $O_2$, NO, $H_2$, $H_2O$ and He whose kinetic diameters are respectively (3.46 Å, 3.4 Å, 3.3 Å, 3.17 Å, 3.89 Å, 2.65 Å and 2.6 Å), all of them smaller than the diameter of the filter nanopores. For the engine, the important thing in this group is oxygen, since the rest before combustion intervene in negligible quantities or are inert.

FIG. 2 shows a portion of the membrane or filtering sieve formed by two layers of atoms and to which the pores 5g have been made by means of laser beams. More than two layers of atoms can be used.

FIG. 3 shows a portion of hollow fiber. Entering the air at one end and leaving the $O_2$, $CO_2$ and $H_2O$ laterally and radially. Crossing the membrane and leaving the $N_2$ at the other end, of larger dimensions, which cannot cross the membrane.

Figure 4:
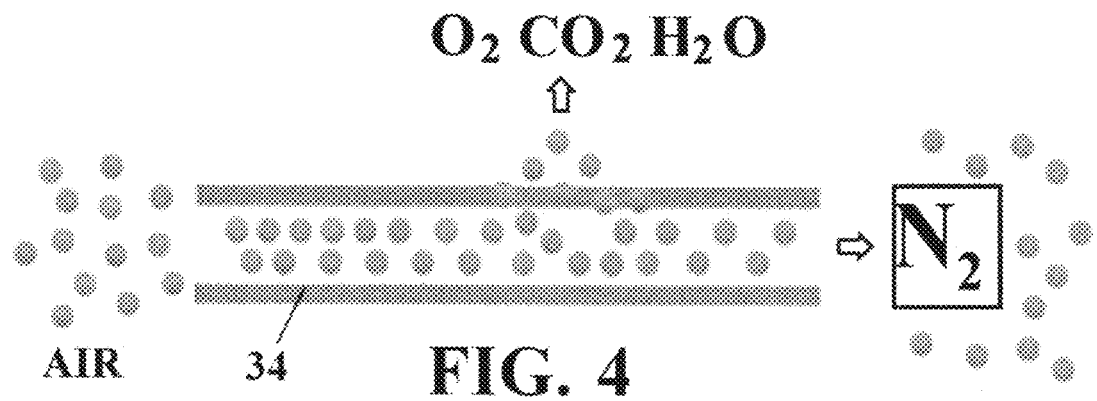
FIG. 4 shows a schematic and sectional view of a hollow fiber portion for air filtering.

FIG. 4 shows a portion of the hollow fiber membrane 34. Similar to FIG. 3 but showing the intervening elements. Entering the air at one end and leaving the $O_2$, $CO_2$ and $H_2O$ laterally and radially, crossing the membrane and leaving the $N_2$ at the other end, of larger dimensions, which cannot pass through the membrane.

Figure 5:
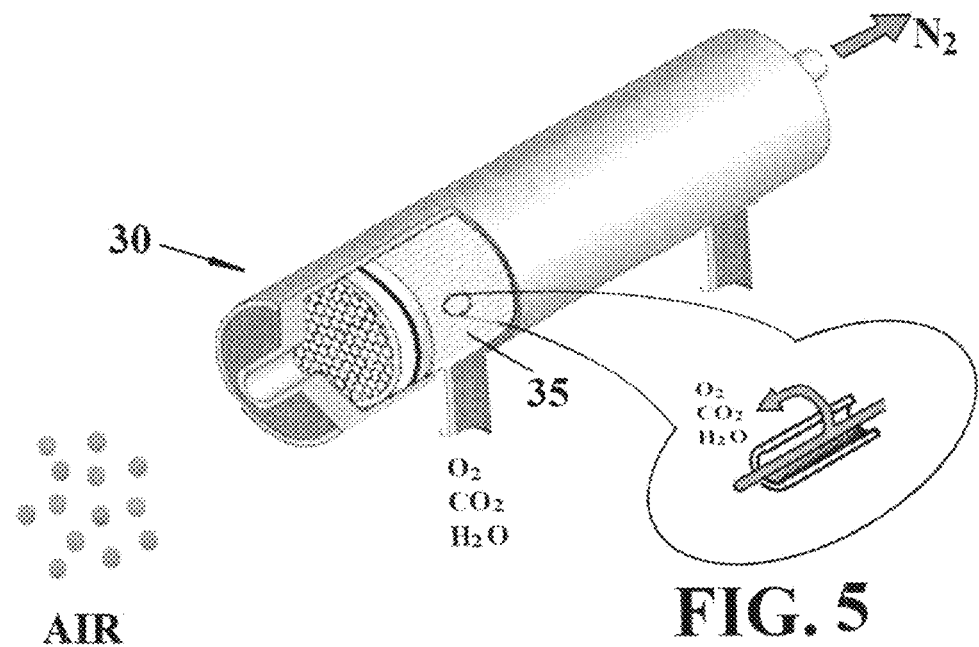
FIG. 5 shows a schematic, perspective and partially sectioned view of a hollow fiber membrane module for air filtering.

FIG. 5 shows a hollow fiber membrane module 30. Air entering at one end and $O_2$, $CO_2$ and $H_2O$ exiting laterally and radially, crossing the group of membranes 35 and $N_2$ exiting at the other end, which cannot pass through the membrane due to its larger dimensions.

Figure 6:
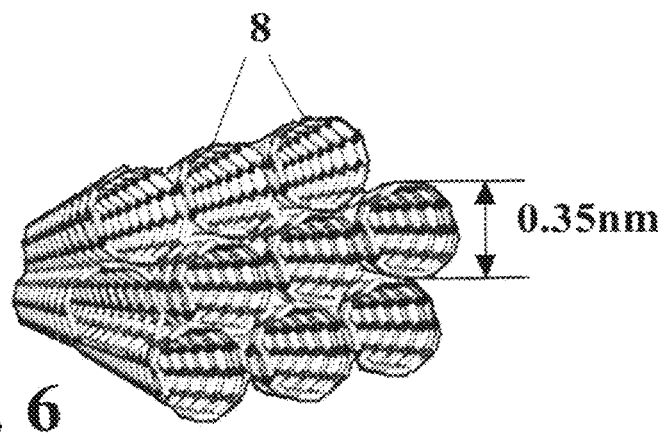
FIG. 6 shows a schematic, partial and perspective view of a portion of the membrane formed by several nanotubes attached laterally to each other.

FIG. 6 shows a portion of the filtering membrane or sieve formed by the nanotubes 8 attached laterally to each other. In this case, the internal diameter of the nanotubes is 0.35 nm through which the filtering is carried out, allowing the passage of $O_2$.

Figure 7:
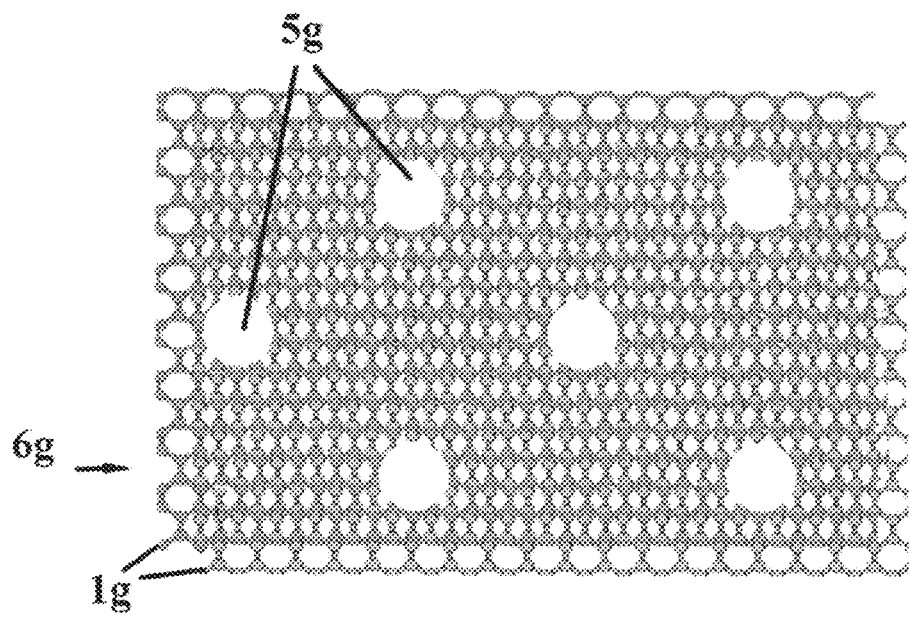
FIG. 7 shows a schematic view similar to that of figure two, but with a greater description of the elements.

FIG. 7 shows a portion of the filtering membrane or sieve 6g formed by two layers of atoms 1g and to which the pores 5g have been made by means of laser beams. More than two layers of atoms can be used.

Figure 8:
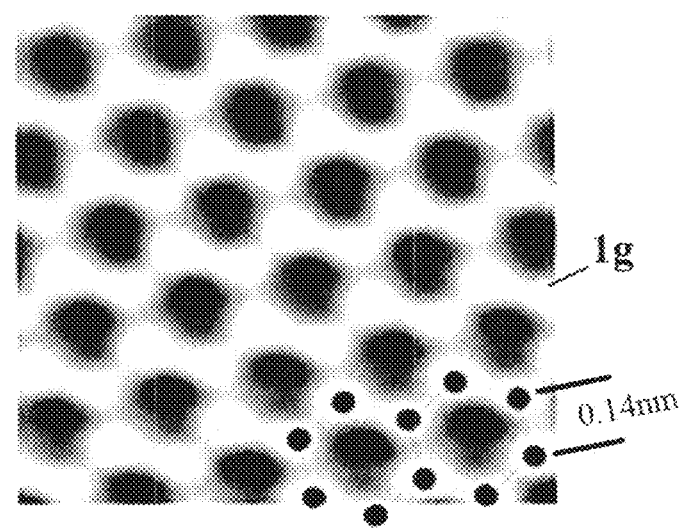
FIG. 8 shows a schematic and partial view of a portion of the graphene layer showing the atoms.

FIG. 8 shows the microscope view of a portion of a sheet or layer of graphene whose atoms form a network with cells or hexagonal grids, with the atoms at 0.14 nm each from its neighbor, therefore the internal gap of said cells is between 0.20 and 0.25 nm, (or its equivalent: between 2 Å to 2.5 Å) that is, less than the kinetic diameter of He. For this reason, the nanopores must be made larger, which allow the passage of $O_2$.

Figure 9:
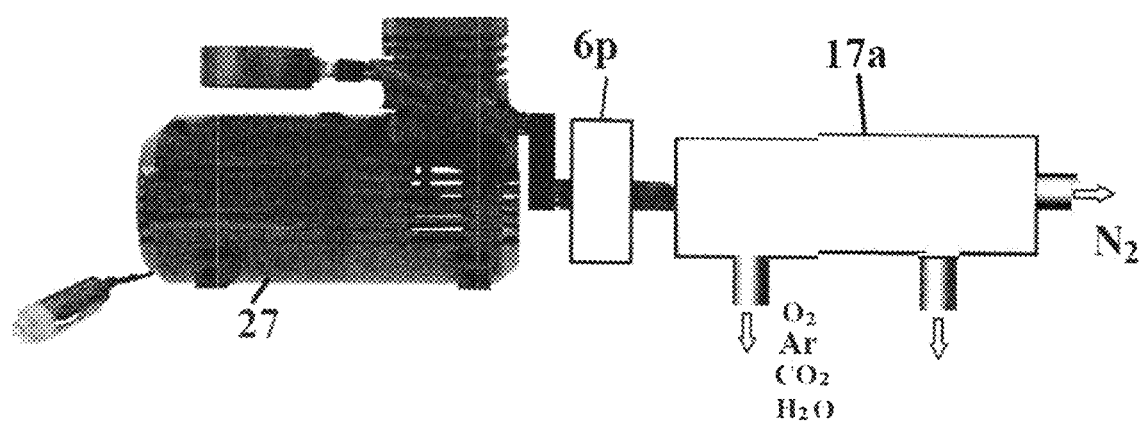
FIG. 9 shows a schematic view of a compressor applying air to a nanoparticle filter, a nitrogen-oxygen separator, among other elements.

FIG. 9 shows the electrically powered compressor 27, which drives the air through a particulate filter 6p to the hollow fiber module 17a. Mainly separating nitrogen from oxygen, in addition to other less important elements mixed with $O_2$, argon, $CO_2$ and water vapor come out. Nitrogen can be used for industrial uses or it can be released abroad. The particle filter 6p can be placed at the compressor inlet.

Figure 10:
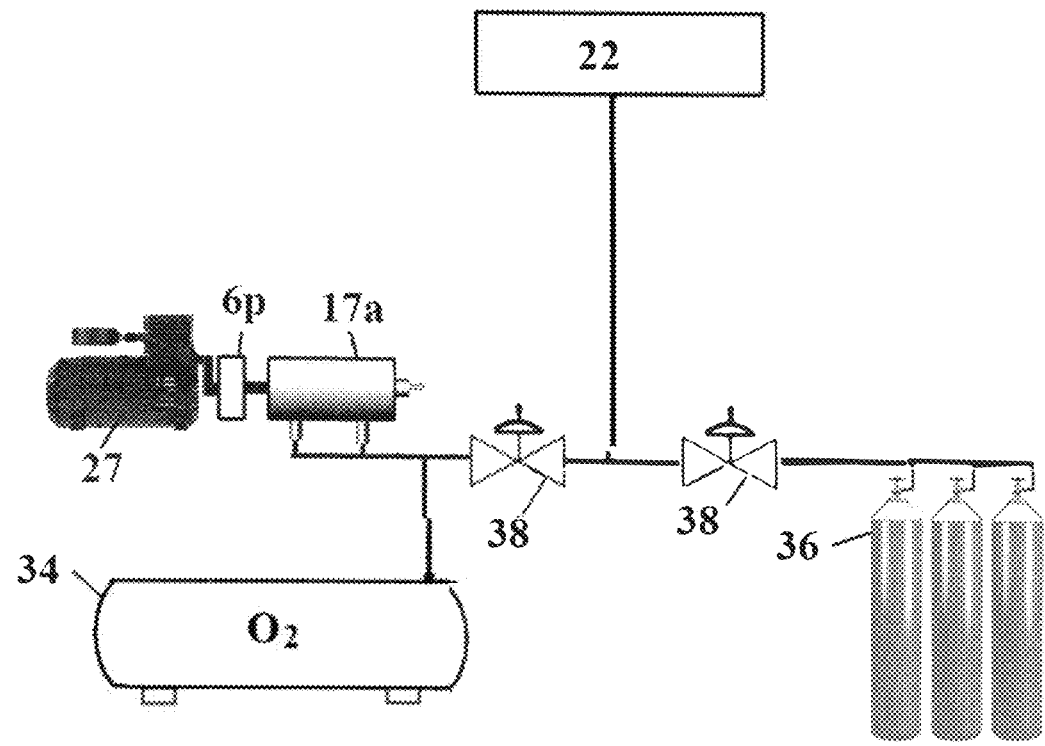
FIG. 10 shows a schematic view of a diagram of a possible mode of application of the oxygen installation.

FIG. 10 shows an installation with a compressor 27 which drives the air through a particle filter 6p to the hollow fiber module 17a, which separates the oxygen and through the ducts 35 joins that of the bottles 36 to send it to the storage chamber 34 and at the same time it is supplied to the engine intake system 22 through a solenoid valve 38 controlled by a microprocessor 37 or a similar system. Any other type of nanomolecular filter can be used. The particle filter 6p can be placed at the compressor inlet. The bottles 36 can be oxygen alone or mixed with argon.

FIG. 11 shows a cylindrical cartridge 17 consisting of a cylindrical cover, not shown in the figure, inside which a wound membrane is placed, which is shown unfolded, and is formed by two separate separator or spacer sheets. The sheet 13 with large pores, woven or made of fibers, preferably larger than those arranged parallel to the axis of the filter, carries the nanomolecular filter layer 6f on one side. The sheet 13a carries its outermost face with a waterproof film 20 The air, after passing through a quick-release particulate pre-filter and not shown in the figure, passes through the disc 18 with large pores or made of fibers or fabric and enters through the adjacent end of the sheet 13 of fabric or made of fibers with large pores, preferably arranged parallel to the axis of the filter, and from this, since it cannot exit through the blocked end 15a, oxygen passes through the filter 6f to the separating and porous sheet 13a, which having its end 15 blocked, does so at the opposite end, through the disc 18a with large pores or made of fibers or fabric, leaving the filter as shown by the left arrow. The sheets 13 have their ends sealed with waterproof tapes, cords or adhesives 15 and 15*a*. The nitrogen with the waste elements is sucked or pushed to the outside through a conduit not shown in the figure.

FIG. 12 shows a cylindrical cartridge 17 with a cylindrical cover, not shown in the figure, inside which a one-piece wound membrane is placed, which is shown unfolded, formed by two separator or spacer sheets attached and between them. the nanomolecular filter layer 6*f*. The sheet 13*a* carries its outermost face with a waterproof film 20. After passing through a particulate pre-filter not shown in the figure, the air passes through the disc 18 with large pores, woven or made of fibers, and enters through the adjacent end of the sheet 13 and from this, by not being able to exit through 15*a* blocked, the oxygen passes through the filter 6*f* to the separating and porous sheet 13*a*, which, has its end obstructed, exits through the opposite end, through the disc 18*a*, of large pores or tissue, leaving the filter as shown by the arrow with larger dimensions. The ends of the sheets 13 are sealed with waterproof tapes, cords or adhesives 15 and 15*a*. The nitrogen with the waste elements is sucked or pushed to the outside through a conduit not shown in the figure.

Figure 13:
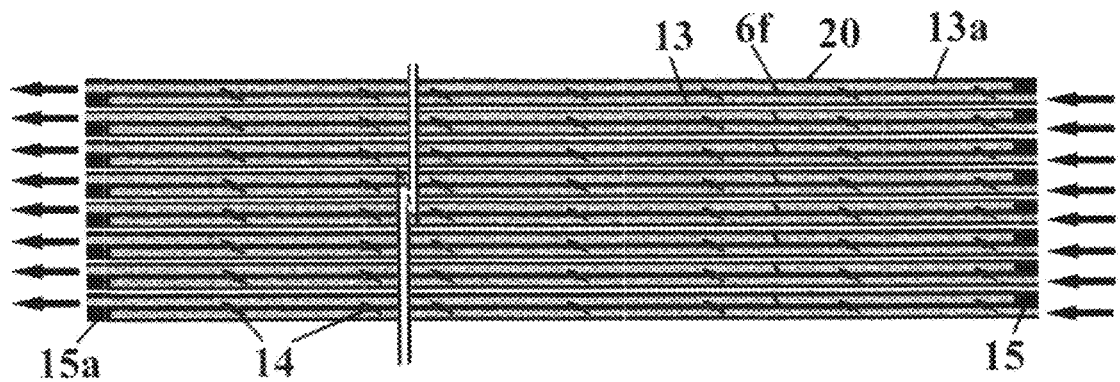
FIG. 13 shows a schematic, partial and partially sectioned view of a parallelepiped filter.

FIG. 13 shows the parallelepiped nanofilter whose membrane consists of multiple alternated flat porous sheets 13 and 13*a*. The air, after passing a particle pre-filter, enters the parallelepiped filter through a porous coupling element, then passing through the side and inside half of the porous sheets 13 and is forced, because its other parts are lateral ends 15*a* sealed, to allow oxygen to pass into the other half of alternate sheets 13*a* after passing through, arrows 14, the intermediate nanofilter layers 6*f*, exiting through the sides of these second sheets together with the outlet of the parallelepiped filter, as the other lateral ends 15 are obstructed, leaving the parallelepiped filter after passing through another porous coupling element. The sheets 13*a* carry their outermost face of each pair of sheets, with a waterproof film 20. This view is valid for the membranes of spiral cylindrical filters. The large surface area of the systems in FIGS. 11, 12 and 13 allow a higher O2/N2 separation rate.

Figure 14:
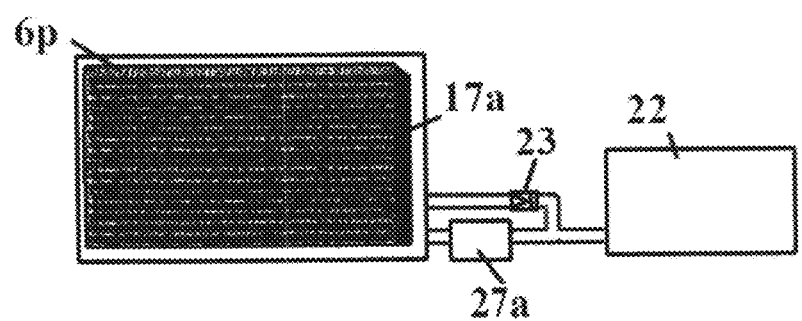
FIG. 14 shows a schematic view of a non-moving motor, for example, from a factory.

FIG. 14 shows the non-displacement or stationary engine 22 that receives the oxygen or oxygen-air mixture after passing through a large filter set consisting of a suspended particulate pre-filter 6*p* and subsequently a nanomolecular filter 17*a*. Oxygen can be sucked into the engine through the check valve 23, or it can be sucked in and driven by the compressor or motor pump 27*a*. The motorized pump can be placed before the filters, sucking the air from outside and propelling it through said filters, which in this case would be in a hermetic chamber. The pumps can be powered by renewable energy. The non-return valve can be eliminated by placing a selector valve at the confluence of the suction conduit with that coming from the compressor or motor pump 27*a* that selects the oxygen sucked by the engine or the one driven by the motor pump.

Figure 15:
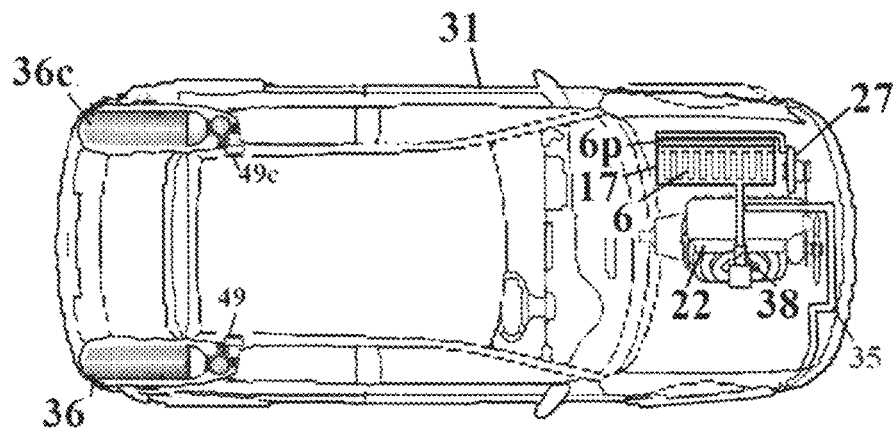
FIGS. 15 to 19 show schematic views in plan and partially sectioned of vehicles with variants of the system of the invention.

FIG. 15 shows an embodiment of the invention on the vehicle 31 with the engine 22. The oxygen is sent from the bottle 36 through the conduit 35. One or several bottles, placed in the lateral or rear areas. The air is propelled by the compressor 27 driven by the engine, through the suspended particle filter 6*p*, and then the nanomolecular filter 17 with multiple membranes or multi-pore sheets 6 with a large surface area and the oxygen supply valve 38 to the engine. To facilitate admission and the amount of filtering, both filters, which may have a large surface area, can be placed in the middle or rear areas of the vehicle, where there is more space. The CO2 is stored in the bottle 36*c* and is extracted through the coupling 49*c*. The O2 is charged by the coupling 49.

Figure 16:
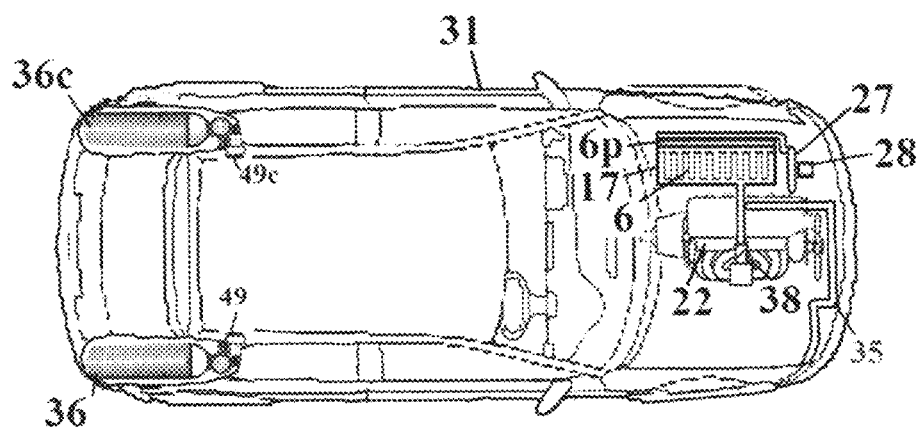

FIG. 16 shows an embodiment of the invention on the vehicle 31 with the engine 22. The oxygen is sent from the bottle 36 through the conduit 35. The air is driven by the compressor 27 driven by the electric motor 28, through the suspended particle filter 6*p*, and then by the nanomolecular filter 17 with multiple membranes or sheets 6 with multiple pores. with a large surface area and the valve 38 for the oxygen supply to the engine. To facilitate the admission and the amount of filtering, both filters, which can be large, are placed in the middle or rear areas of the vehicle, where there is more space. It can be considered an adapted engine. The CO2 is stored in the bottle 36*c* and is extracted through the coupling 49*c*. O2 is charged through the connector or coupling 49.

Figure 17:
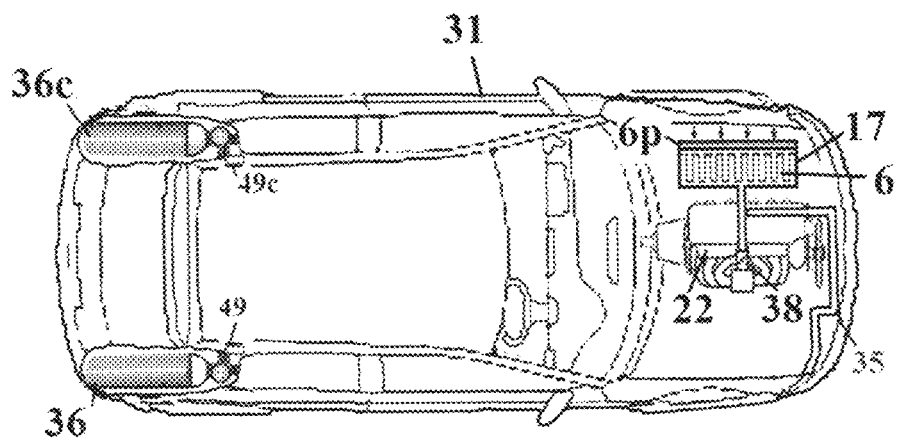

FIG. 17 shows the vehicle 31 with the engine 22, the suspended particle filter 6*p*, the nanomolecular filter 17 with multiple membranes or sheets 6 with multiple large-surface pores, the valve 38 for the oxygen supply to the engine. The motor is powered by suction. To facilitate the admission and the amount of filtering of both filters and that they can be large, they are even placed in the middle or rear areas of the vehicle. It can be considered as an adapted engine. Oxygen is also sent from the bottle 36 through the conduit 35. The CO2 is stored in the bottle 36*c* and is extracted through the coupling 49*c*. The O2 is charged through the connector or coupling 49 through a hose.

Figure 18:
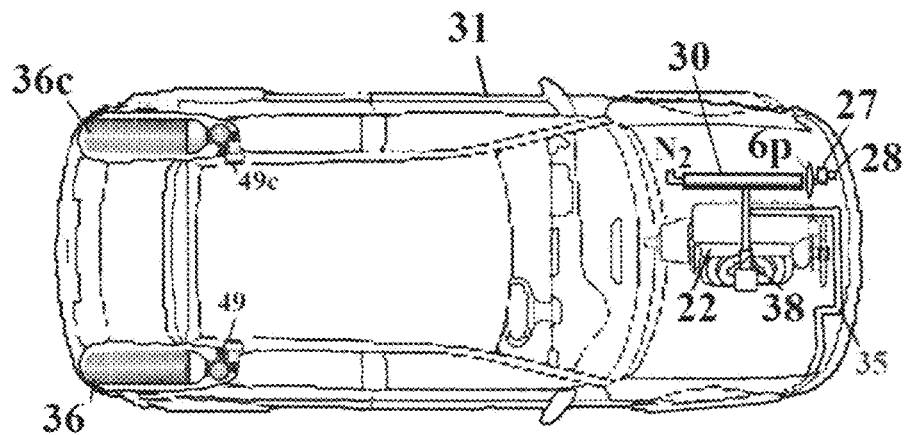

FIG. 18 shows the vehicle 31 with the engine 22. The air is driven by the compressor 27 driven by the electric motor 28, through the suspended particle filter 6*p*, and then through the hollow fiber membrane module 30. Next, the oxygen flow is regulated by valve 38. The nitrogen N2 that is produced can be stored or sent abroad. The motor can be powered by suction. It can be considered as an adapted engine. Oxygen is also sent from the bottle 36 through the conduit 35. The CO2 is stored in the bottle 36*c* and is extracted through the coupling 49*c*. O2 is charged through the connector or coupling 49.

Figure 19:
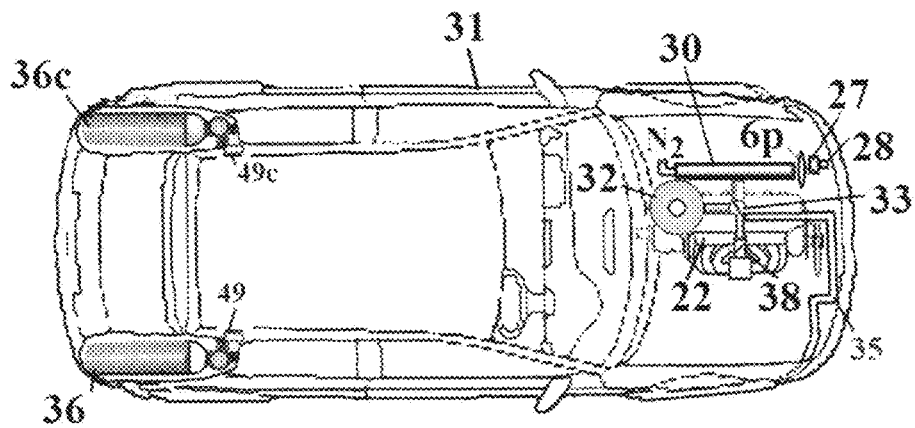

FIG. 19 shows the vehicle 31 with the engine 22. Part of the air is driven by the compressor 27 driven by the electric motor 28, through the suspended particle filter 6*p*, and then through the hollow fiber membrane module 30 oxygen is obtained. The obtained oxygen is variably mixed with the air that enters through the current filter 32 through the mixing valve 33. Next, the mixture of air and oxygen is regulated by means of the valve 38. The nitrogen N2 that is produced can be stored or sent abroad. The motor can be powered by suction. It can be considered as an adapted engine. Oxygen is also sent from the bottle 36 through the conduit 35. The CO2 is stored in the bottle 36*c* and is extracted through the coupling 49*c*. The O2 is charged through the connector 49.

Figure 20:
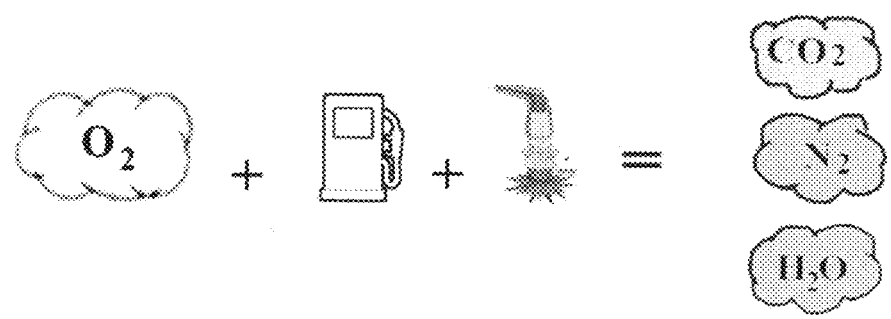
FIGS. 20 to 24 show views of modes of operation.

FIG. 20 shows a complete combustion of a hydrocarbon with oxygen when a spark is applied, resulting in CO2, N2 and H2O. Which are not toxic and in the case of hydrogen CO2 is not produced either.

Figure 21:
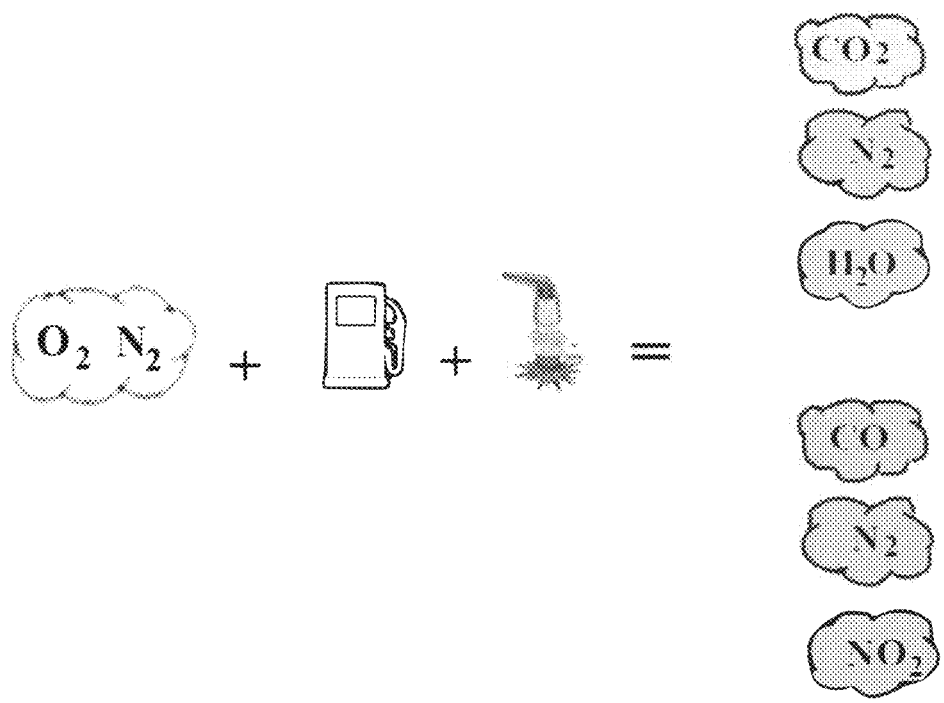

FIG. 21 shows incomplete combustion of a hydrocarbon with oxygen when a spark is applied, resulting in non-toxic CO2, N2 and H2O, and highly toxic CO, HC and NO2.

Figure 22:
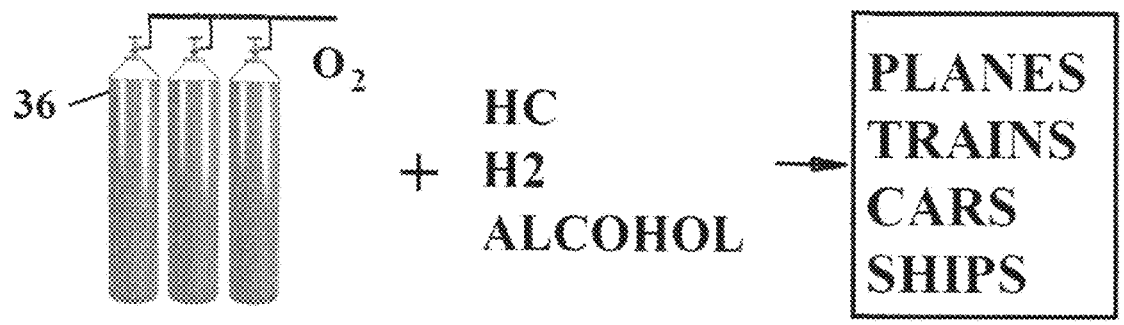

FIG. 22 shows the use of oxygen (O2) from the bottles 36 as an oxidizer that with a hydrocarbon (HC), hydrogen (H2) or alcohol is used in Aircraft, Train, Car and Ship engines.

Figure 23:
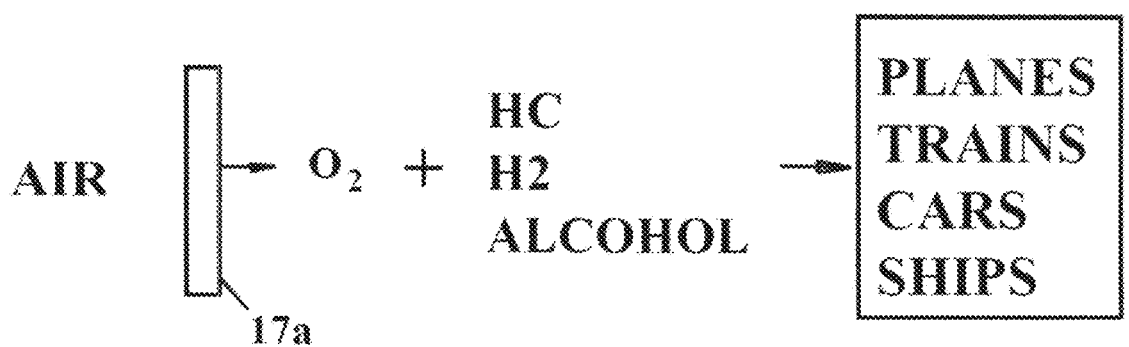

FIG. 23 shows the use of oxygen (O2) obtained by filtering the air through the filter 17*a*, as an oxidizer that with a hydrocarbon (HC), hydrogen (H2) or alcohol is used in engines of Aircraft, Trains, Cars and Ships.

Figure 24:
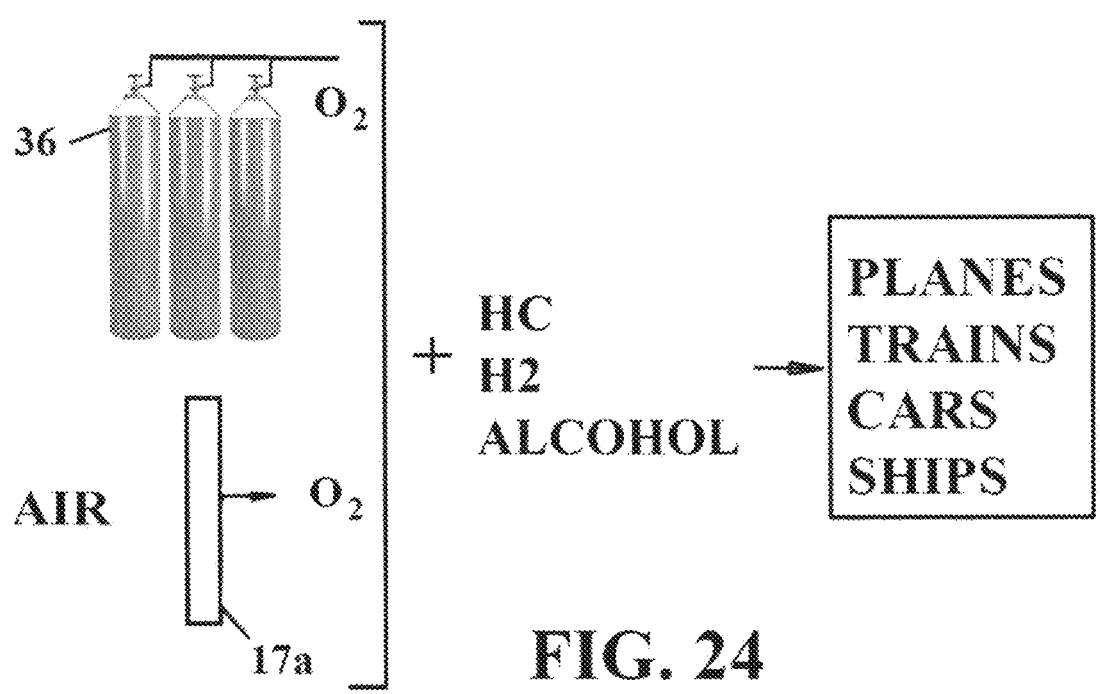

FIG. 24 shows the use of O2 from the bottles 36 and that obtained by filtering the air through the filter 17a as an oxidizer that with a hydrocarbon (HC), hydrogen (H2) or alcohol is used in Airplanes, Trains, Cars and Ships.

Figure 25:
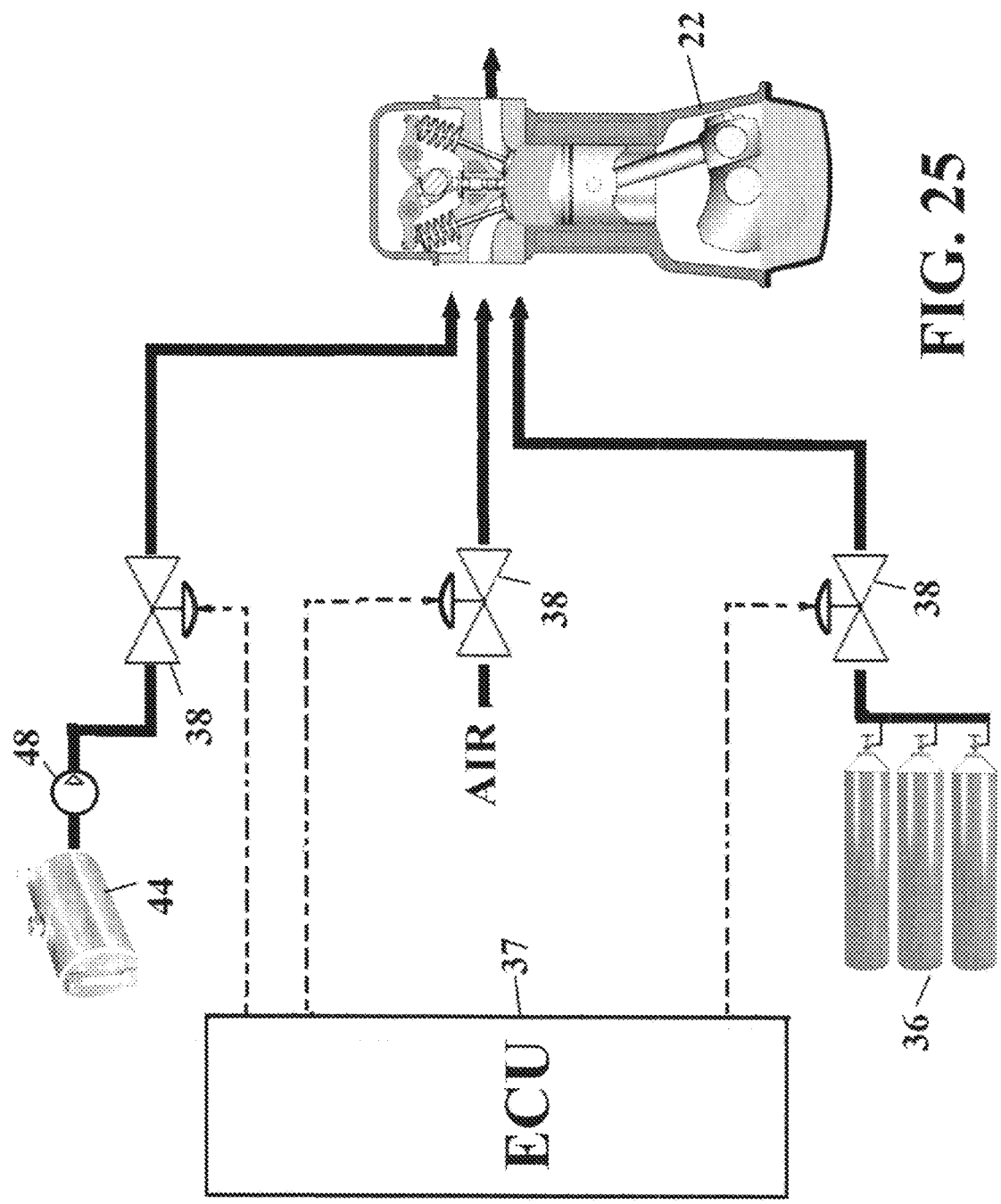
FIGS. 25 to 28 show views of various operating diagrams.

FIG. 25 shows the pump 48 that sends the fuel from the tank 44 to the engine 22 controlled by the ECU 37 and solenoid valve 38, that can be a throttle control. The ECU also controls an solenoid valve 38 that regulates the O2 from the bottles to the engine 22. An optional solenoid valve 38 controls the air rate.

Figure 26:
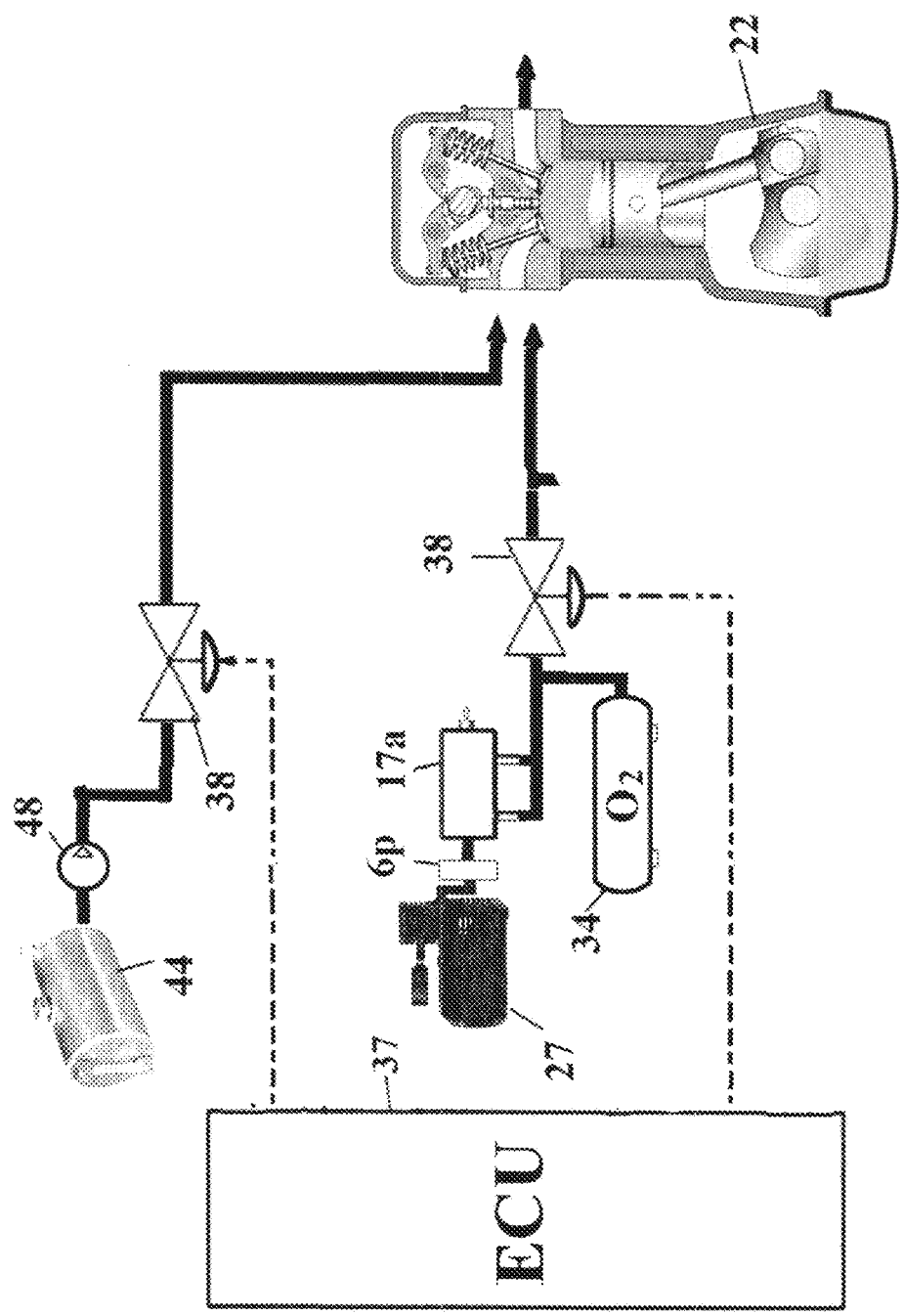

FIG. 26 shows the pump 48 that sends the fuel from the tank 44 to the engine 22. Controlled by the ECU 37 and the solenoid valve 38 that could be a throttle. Also through a solenoid valve 38 it controls the O2 obtained by filtering the air with the compressor 27, the particle filter 6p, the nanomolecular filter 17a and the O2 coming from the tank 34 to the engine 22.

Figure 27:
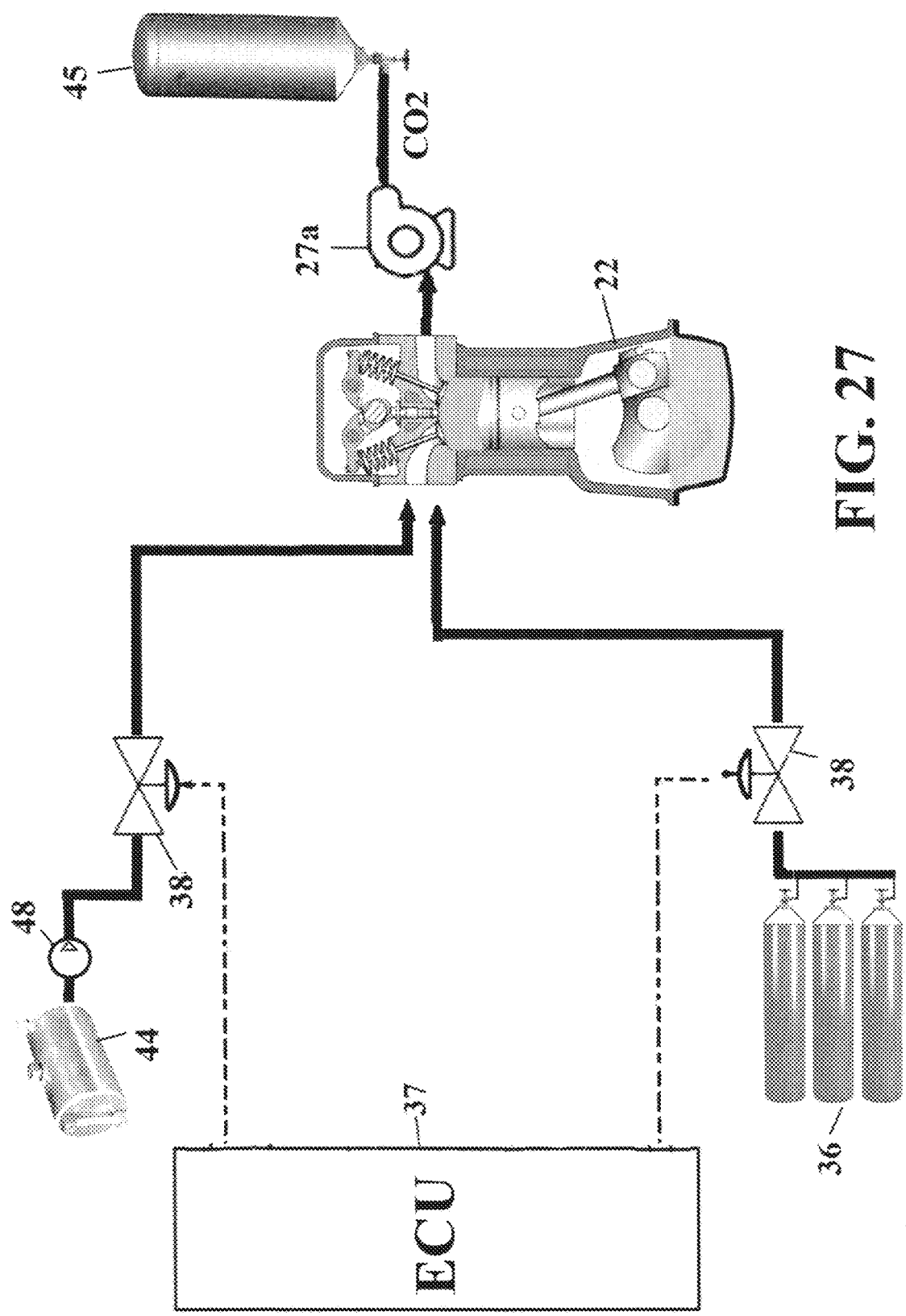

FIG. 27 shows the pump 48 that sends the fuel from the tank 44 to the engine 22. Controlled by the ECU 37 and the solenoid valve 38 that can be a throttle. Which also controls with another solenoid valve 38 the O2 from the O2 bottles to the engine 22. If air is not used, the exhaust gases only carry CO2, which is compressed by the compressor 27a and stored in the tank 45.

Figure 28:
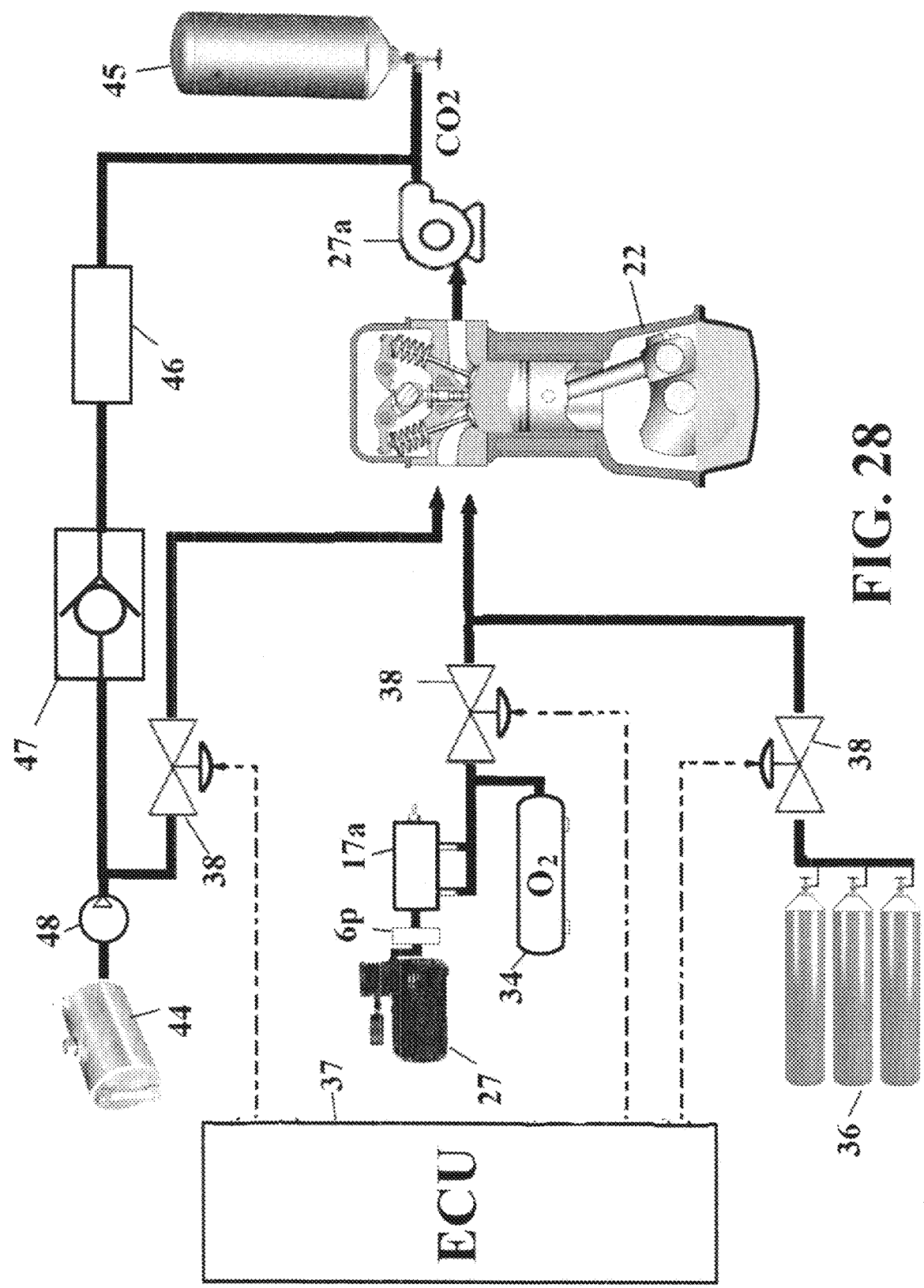

FIG. 28 shows the pump 48 that sends the fuel from the tank 44 to the engine 22. Controlled by the ECU 37 and the solenoid valve 38 that can be a throttle. It also controls with another solenoid valve 38 the O2 from the bottles 36 to the engine 22 and controls with an solenoid valve 38 the O2 obtained by filtering the air by the compressor 27, particulate filter 6p, nanomolecular filter 17a and the one coming from the tank 34 to the motor 22. If air is not used, the exhaust gases are only CO2, which is compressed by the compressor 27a and stored in the tank 45 or transformed into fuel mixed with water at high pressure and temperature in the chamber 46. through renewable energies, feeding back through the check valve 47 to the fuel circuit.

Figure 29:
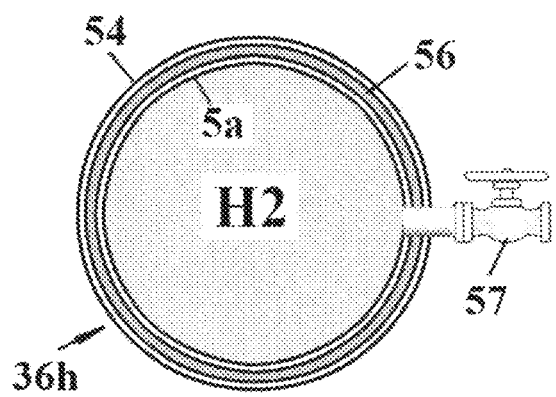
FIG. 29 shows a schematic and sectional view of a hydrogen bottle.

FIG. 29 shows a hydrogen bottle 36h which has a chamber 56 between the outer cover 54 and the inner cover 5a, with a fluid at a higher pressure than the internal H2. The H2 outlet is initially controlled by the manual valve 57. In a variant, three covers or casings can be used, the innermost made of a polymer with very little permeability and the outermost protective against flames.

Figure 30:
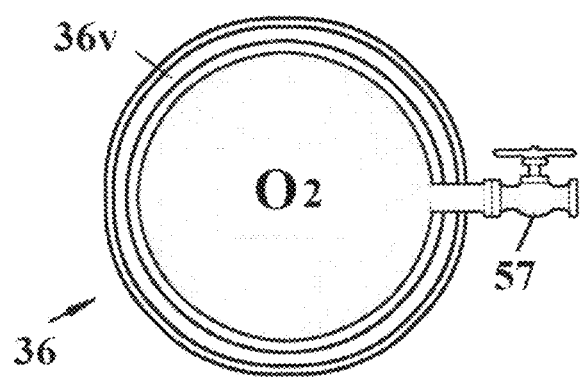
FIG. 30 shows a schematic and sectional view of a liquid oxygen cylinder.

FIG. 30 shows a bottle 36 of liquid oxygen which has an intermediate chamber 36v in which a vacuum is made. The O2 outlet is initially controlled by the manual valve 57. This system can be applied to other liquefied gases.

Figure 31:
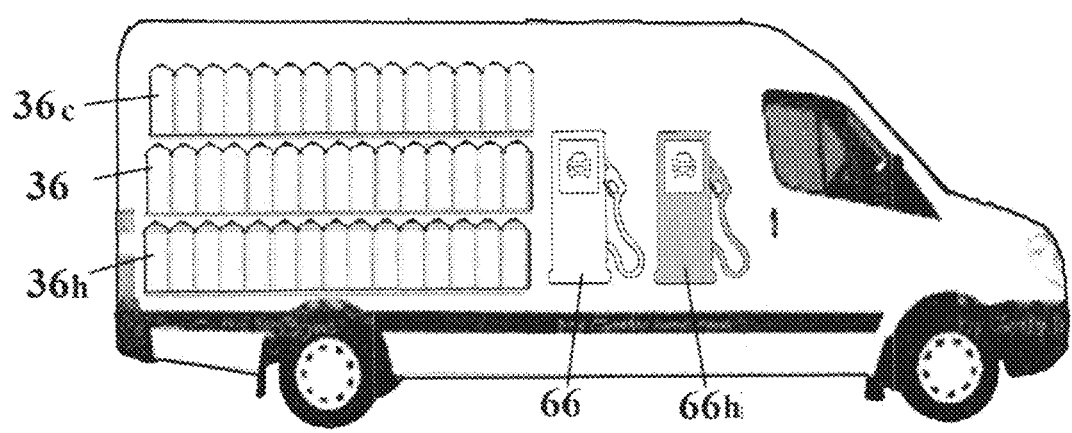
FIG. 31 shows a vehicle with the refueling systems using bottles and oxygen, hydrogen and other fuels, both gaseous and liquid, of the system of the invention.

FIG. 31 shows a truck or van which carries, among other things, hydrogen bottles 36h, oxygen bottles 36 and discharged CO2 bottles 36c. It also carries an oxygen pump 66 and a hydrogen pump 66h and the possibility of extracting CO2 with hoses. In all cases, all these elements are suitably conditioned and protected.

Figure 32:
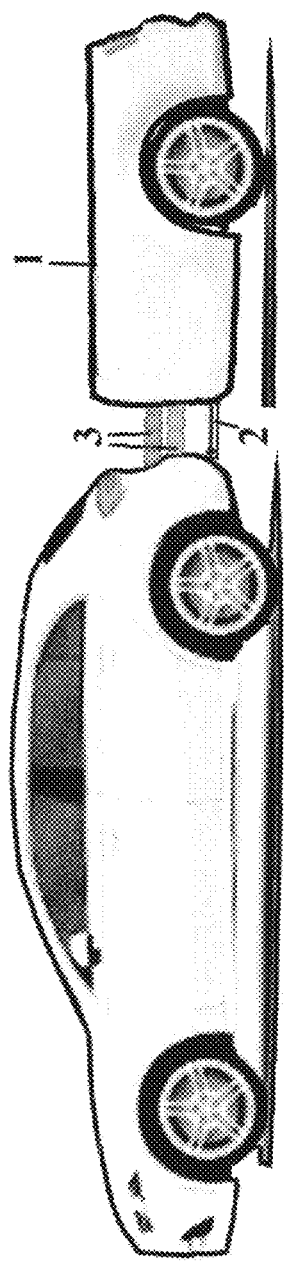
FIG. 32 shows a schematic and elevation view of a vehicle with the trailer of the invention.

FIG. 32 shows an embodiment of the invention, consisting of the trailer 1, the element or articulated support bar 2 and the corrugated plastic covers 3 that surround the fuel transmission ducts and/or or oxidizers.

Used valves can be replaced by solenoid valves. This system of bottles and refills with hoses is also valid for gasoline, natural gas and other fuels used in service stations. But it is preferably reserved for low-use fuels. Alcohol and hydrogen use a facility not shown in the figures. Some valves and sensors are also not shown to facilitate the interpretation of the plates. Stoichiometric ratio or combustion, ideal ratio (air/fuel, by weight), most efficient. Lambda A factor: Gasoline engine: 14.7, diesel: 14.5 and ethanol: 6.7. The lambda probe is in charge of measuring and controlling that the mixture that reaches the cylinder for combustion is adequate for the fuel used. The ECU receives information from the engine: rpm, intake flow, cooling temperature and throttle valve position. A rich mixture increases fuel consumption, hydrocarbon (HC) and carbon monoxide (CO) emissions, reduces power, increases carbon deposits, fouls spark plugs, and dilutes engine lubricating oil. Lean mixture, using more air than necessary, higher fuel temperature, reduces power, raises engine temperature and increases (NOx)—causes pre-ignition—violent combustion and serious engine damage. Other types of O2 filtering can be applied, as well as CO2 treatment to obtain fuels, existing or to be designed. Bottles can be exchanged at stops or O2 can be injected and CO2 extracted via hoses at service stations.

The invention claimed is:

1. Oxidizer and fuel supply system for an internal combustion engine, comprising:
    an electronic controller;
    an oxygen supply fluidically connected to the engine, said oxygen supply including a first regulating valve connected to said controller and controlled by said controller for controlling a flow of oxygen, said oxygen supply including a compressor fluidically connected to a nanomolecular filter for feeding air to said nanomolecular filter, said nanomolecular filter constructed for filtering the air fed through said nanomolecular filter for filtering out nitrogen and allowing oxygen to pass said nanomolecular filter for supply to the engine;
    a fuel supply fluidically connect to the engine, said fuel supply including a second regulating valve connected to said controller and controlled by said controller for controlling a flow of the fuel.

2. The system according to claim 1, wherein said oxygen supply includes an oxygen storage bottle filled with oxygen for supply to the engine.

3. The system according to claim 1, further comprising a storage tank fluidically connected to said nanomolecular filter for storing oxygen that is in excess to the requirements of the engine.

4. The system according to claim 1, wherein said nanomolecular filter is a nanomolecular membrane filter.

5. The system according to claim 1, wherein said nanomolecular filter is a hollow fiber membrane with walls that have 3.5 Å pores.

6. The system according to claim 5, wherein said membranes have a layer of graphene or graphene oxide and have a thickness between 0.5 and 10,000 nm, and are formed by one or multiple layers of atoms, in which said pores are formed.

7. The system according to claim 6, wherein said one or multiple layers of atoms are attached to a layer of permeable substrate.

8. The system according to claim 1, wherein the nanomolecular filter is a cylindrical cartridges that has a cylindrical cover inside which there is a wound membrane defined by two fabric or fiber sheets, with pores or slits, said sheets carry a sheet of nanomolecular filter layer and an impermeable film on an outermost face, said cylindrical cartridge has a disc.

9. The system according to claim 1, wherein the nanomolecular filter is defined by parallelepiped elements formed by multiple membranes arranged in flat or wound layers, alternated with other separators.

10. The system according to claim 1, further comprising a particle filter disposed upstream of said nanomolecular filter is part of a hollow fiber module, said compressor drives the air through said particle filter to said hollow fiber module.

11. The system according to claim 1, wherein said fuel supply has a tank and a fuel pump controlled by the controller to regulate the flow of fuel to the engine.

12. Oxidizer and fuel supply system for an internal combustion engine, comprising:
an electronic controller;
an oxygen supply fluidically connected to the engine, said oxygen supply including a first regulating valve connected to said controller and controlled by said controller for controlling a flow of oxygen;
a fuel supply fluidically connect to the engine, said fuel supply including a second regulating valve connected to said controller and controlled by said controller for controlling a flow of the fuel
said fuel supply having a tank and a fuel pump controlled by the controller for regulating the flow of fuel to the engine, said tank being a hydrogen storage bottle having an external cover and an inner cover defining a chamber therebetween, said chamber having a fluid at a higher pressure than the internal pressure of the hydrogen, said external cover being fireproof against flames.

13. Oxidizer and fuel supply system for an internal combustion engine, comprising:
an electronic controller;
an oxygen supply fluidically connected to the engine, said oxygen supply including a first regulating valve connected to said controller and controlled by said controller for controlling a flow of oxygen;
a fuel supply fluidically connect to the engine, said fuel supply including a second regulating valve connected to said controller and controlled by said controller for controlling a flow of the fuel
said controller being configured for receiving operating signals from the engine and, depending on the regime and type of exhaust gases, controlling the flow of fuel and oxygen.

14. The system according to claim 2, wherein said storage bottle carries a liquefied gas and have an intermediate chamber in which a vacuum is provided.

15. The system according to claim 11, wherein said tank, said fuel pump, said controller and said engine are part of a vehicle.

16. The system according to claim 1, further comprising a trailer having a connection to a vehicle, said trailer carrying said fuel supply and said oxygen supply.

17. The system according to claim 1, further comprising an air intake with a third regulating valve, said regulating valves control the atmospheric air/O2 mixture in fixed or variable proportions with said processor.

18. The system according to claim 1, wherein said fuel supply is a pressurized hydrogen bottle.

19. The system according to claim 18, wherein a pressure of the oxygen or the hydrogen avoids or reduces the need for engine compression.

\* \* \* \* \*